(12) United States Patent
Bewermeyer et al.

(10) Patent No.: US 12,617,265 B2
(45) Date of Patent: May 5, 2026

(54) ARRANGEMENT COMPRISING A PUMP FOR A COOLING CIRCUIT OF A MOTOR VEHICLE

(71) Applicant: HELLA GmbH & Co. KGaA, Lippstadt (DE)

(72) Inventors: Frank Bewermeyer, Paderborn (DE); Benjamin Grothe, Wickede (DE); Christof Hille, Lennestadt (DE); Markus Klamke, Lippstadt (DE); Christian Koester, Warstein (DE); Matthias Mallon, Hamm (DE); Dominik Niess, Selm (DE); Sebastian Stork, Bueren (DE); Sebastian Tiemeyer, Dortmund (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/732,020

(22) Filed: Jun. 3, 2024

(65) Prior Publication Data

US 2024/0399854 A1 Dec. 5, 2024

(30) Foreign Application Priority Data

Jun. 1, 2023 (DE) ..................... 10 2023 114 427.8

(51) Int. Cl.
*B60K 11/02* (2006.01)
*F01P 3/20* (2006.01)
*F01P 5/10* (2006.01)

(52) U.S. Cl.
CPC ................ *B60K 11/02* (2013.01); *F01P 3/20* (2013.01); *F01P 5/10* (2013.01)

(58) Field of Classification Search
CPC ........ B60K 11/02; F01P 3/20; F01P 2007/146
See application file for complete search history.

(56) References Cited

U.S. PATENT DOCUMENTS

| | | | | |
|---|---|---|---|---|
| 10,665,908 | B2 | 5/2020 | Krull et al. | |
| 11,692,476 | B1 * | 7/2023 | Jensen | ... F01P 11/029 |
| | | | | 123/41.54 |
| 2024/0052769 | A1 | 2/2024 | Szenasi et al. | |
| 2024/0191822 | A1 | 6/2024 | Schaefer et al. | |

FOREIGN PATENT DOCUMENTS

| | | | |
|---|---|---|---|
| CN | 217060912 U | * | 7/2022 |
| DE | 102010063264 A1 | | 6/2012 |
| DE | 102011055599 A1 | | 5/2013 |
| DE | 102018125037 A1 | | 4/2020 |

(Continued)

*Primary Examiner* — Syed O Hasan

(74) *Attorney, Agent, or Firm* — Muncy, Geissler, Olds & Lowe, P.C.

(57) ABSTRACT

An arrangement for at least one cooling circuit of a motor vehicle, wherein the arrangement has a pump that has a housing. A motor with a stator and a rotor are arranged in the housing of the pump. A pump chamber is provided in the housing and in which an impeller of the pump is arranged such that it can rotate and be driven by the motor. The impeller conveys the medium to be conveyed by the pump. The arrangement has a tank and/or a distributor device, and wherein at least a first part of the housing is formed in a part of the tank or of the distributor device of the arrangement.

6 Claims, 6 Drawing Sheets

(56)     References Cited

FOREIGN PATENT DOCUMENTS

| | | | | |
|---|---|---|---|---|
| DE | 102019115774 A1 | | 12/2020 | |
| DE | 102019115778 A1 | | 12/2020 | |
| DE | 102022113545 | * | 11/2021 | |
| DE | 102021106969 A1 | | 9/2022 | |
| DE | 102022113545 A1 | * | 11/2023 | ............ F04D 13/14 |
| KR | 20190052283 | * | 5/2019 | |
| KR | 20190052283 A | * | 5/2019 | ........... F16K 11/087 |
| KR | 1020190052283 A | | 5/2019 | |
| WO | WO 2017223232 A2 | | 12/2017 | |
| WO | WO 2022253381 A1 | | 12/2022 | |
| WO | WO 2023104347 A1 | | 6/2023 | |

* cited by examiner

ARRANGEMENT COMPRISING A PUMP FOR A COOLING CIRCUIT OF A MOTOR VEHICLE

This nonprovisional application claims priority under 35 U.S.C. § 119 (a) to German Patent Application No. 10 2023 114 427.8, which was filed in Germany on Jun. 1, 2023, and which is herein incorporated by reference.

BACKGROUND OF THE INVENTION

Field of the Invention

The invention relates to an arrangement for at least one cooling circuit of a motor vehicle, wherein the arrangement has a pump.

Description of the Background Art

Arrangements that have a distributor device are known from the prior art, for example from the documents DE 10 2021 106 969 A1, WO 2022/253381 A1, and WO 2017/223232 A2. Generally, this is a complex injection-molded plastic part to which pumps, lines, valves, tanks, and possibly other components of a cooling circuit can be connected. Formed in the distributor device are passages or lines which can connect the pumps and lines that are coupled to the couplings. The valves can control which couplings are connected to one another. In addition to the distributor devices, the arrangements generally include the pumps and valves and often the tanks as well.

Also known from the conventional art are variants of such arrangements in which a pump is not attached to the distributor device, but instead to a tank.

Reducing construction volume is an ongoing task for developers and designers of motor vehicles and automotive parts. It is likewise an ongoing task to reduce the number of parts required. The developers and designers of the above-mentioned arrangements for cooling circuits in motor vehicles also face these tasks.

SUMMARY OF THE INVENTION

It is therefore an object of the present invention to reduce installation space and the number of parts of a cooling circuit.

This object is attained according to an example of the invention in that the arrangement has a tank and/or a distributor device, and that at least a first part of the housing of a pump is formed in a part of the tank or of the distributor device of the arrangement.

The tank or the distributor device can therefore form a part of the pump housing and in this respect also forms a part of the pump. As a result, an additional part, which up to now has formed this part of the pump housing, can be eliminated. Instead of connecting a complete pump to the distributor device or the tank as in the conventional art, according to the invention, a pump with an incomplete housing is fastened to the distributor device or the tank, by which means the complete pump is then formed.

An arrangement according to the invention can have multiple pumps. It is possible that the first part of the housing in one pump is formed by the distributor device and the first part of the pump housing in another pump is formed by the tank. It is also possible, however, that the first part of the housing in all pumps is formed by the distributor device or the tank. If, for example, three pumps are provided in an arrangement according to the invention, then three parts that are conventionally necessary to form a complete pump can be eliminated since they are replaced by first parts of the housing formed in the distributor device or the tank.

The first part of the housing can form a part of a boundary of the pump chamber. The first part can therefore have structures that form a wall or parts of a wall of the pump chamber, that project into the pump chamber, that interact with the impeller arranged in the pump chamber, etc.

In particular, the first part of the housing can form a wall that also delimits the pump chamber in the radial direction. An annular groove, in which a collar of the impeller of the pump engages, can be provided in the first part of the housing. In this way, the impeller can be supported in the pump housing.

A seal can be created between an inlet and the pump chamber by the meshing of the collar of the impeller and the annular groove of the first part of the housing or of the collar of the first part of the housing and the annular groove of the impeller. The seal can be a labyrinth seal or be similar to a labyrinth seal. Owing to this seal, an unwanted liquid flow between the pump chamber and the inlet is reduced and the efficiency of the pump is increased.

Owing to the collar of the impeller, which, instead of engaging in the inlet, engages in an annular groove of the first part of the housing surrounding the inlet, or alternatively owing to the collar of the first part of the housing surrounding the inlet, which engages in an annular groove of the impeller, a pump according to the invention can have a second bearing for the rotating parts of the pump, which bearing assists in supporting the rotating parts of the pump. This second bearing leads to smoother running of the rotating parts and, as a result, also leads to an improvement in the acoustic properties of the pump. The acoustic emissions produced by the pump in operation are lessened and/or are more pleasant as a result of the second bearing.

It is likewise possible that recesses that are open toward another part of the pump housing are provided in the first part of the housing, and that projections that engage in the recesses are provided on the other part of the housing. The recesses preferably are oriented in a direction parallel to the rotational axis of the impeller.

If the projections and the recesses were not provided, flat surfaces of the first part of the housing and of another part of the housing would possibly abut one another, instead of the projections and the recesses. In contrast, a type of labyrinth seal is produced by the projections and recesses, providing improved sealing between the high-pressure region and the low-pressure region even without an additional seal.

The recesses and projections furthermore make it possible that the first part of the housing of the pump and the other housing part, which can, for example, be the second part of the housing, can only be assembled in one defined position to form the pump chamber. Incorrect assembly of the two housing parts with one another can be prevented by this means.

The recesses and/or projections can have approximately the shape of a right cylinder. This includes a slight inclination of side walls of the projections, which may be necessary when the housing parts are formed by injection molding, for example.

The right cylinders can have a base that resembles a sector of an annulus. The inner walls of the recesses can follow the spiral shape of the wall that radially delimits the pump chamber, for example.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
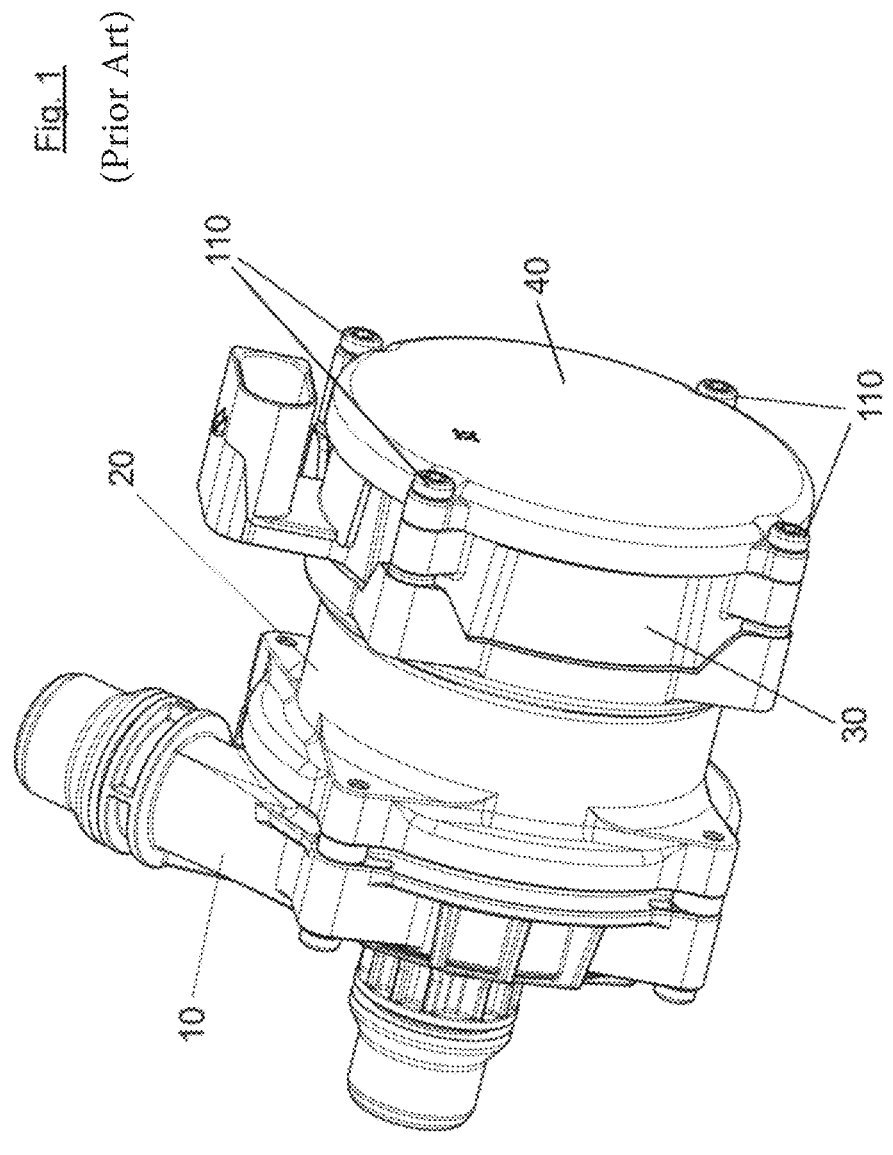
FIG. 1 shows a perspective view of a known pump (FIG. 1 from DE 10 2019 115 774 A1)

The first pump has a multipart housing, namely a first part of the housing 10, a second part of the housing 20, a third part of the housing 30, and a fourth part of the housing 40, wherein a stator 50 of a motor of the pump is provided in the third part 30. The motor of the pump is completed by a rotor 60, which is rotatably mounted on the second part of the housing 20 and projects into the stator 50. The stator 50, in turn, projects into the second part of the housing 20. Moreover, a circuit carrier 70 is provided, on which an electronic circuit 80 is provided, by which means the motor is supplied with electrical energy and is controlled. An electronics compartment E, in which the circuit carrier 70 and the circuit 80 are arranged, is delimited by the third part 30 and the fourth part 40 of the housing.

The housing parts 10, 20, 30, 40 can be made of plastic, for example of Vyncolit. The stator 50 is molded into the third part 30, preferably into a first wall 301, which is formed by a skirt of the third part 30.

The first part of the housing 10 and the second part 20 are connected to one another by screws. The fourth part 40 and the third part 30, and the third part 30 and the second part 20, are connected to one another by screws.

In order to achieve a more pressure-resistant connection between the first part 10 and the second part 20, a flange 101 of the first part 10 has a continuous web 102, which engages in an interlocking manner in an annular groove 203 of the second part 20 that is provided in a first flange 201 of the second part 20. In this way, an expansion of the first part 10 and of the second part 20 during operation of the pump on account of the pressure present there can be avoided or at least reduced.

The first part 10 and a wall 204 of the second part 20, namely a second wall through which a motor shaft 601 passes, enclose a pump chamber P in which the impeller 90 is located. The pump chamber P can be connected by an intake fitting 103 of the first part 10 to a line through which the liquid to be pumped is drawn in. The intake fitting 103 is arranged coaxially to a rotational axis of the rotor 60.

Figure 5:
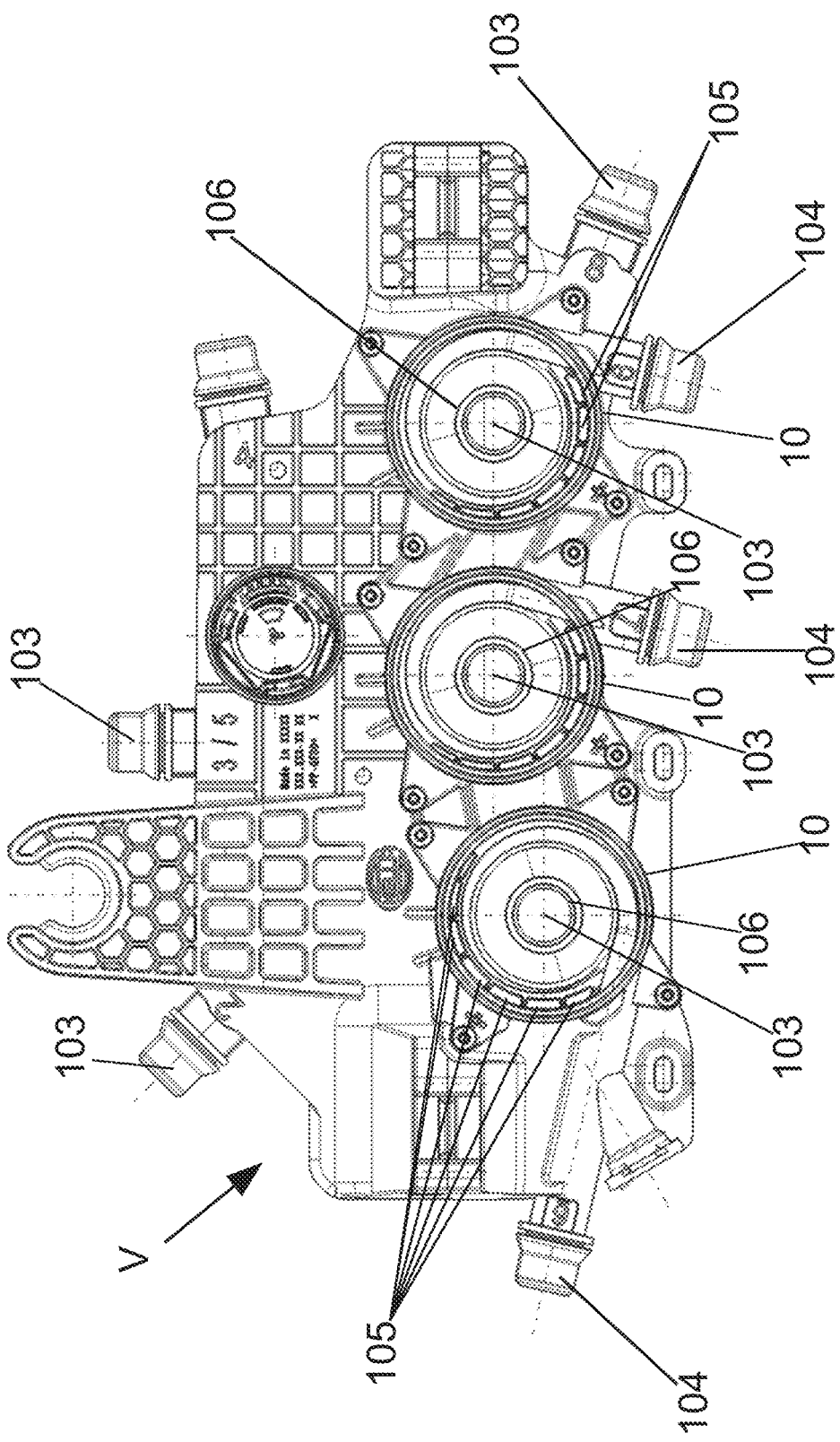
FIG. 5 shows a top view of the distributor device of the arrangement according to the invention.

The pump chamber P can be connected by an outlet fitting 104 to a line into which the pumped liquid is forced. An outside wall of the first part 10 and the impeller 90 delimit a spiral space S, which extends in a spiraling manner to the outlet of the pump chamber. The impeller 90 is designed in a manner known per se, for example in a manner shown in the document DE 10 2011 055 599 A1, FIGS. 2, 3, or 5, to which reference is made for detailed explanation of a suitable impeller 90 for a pump according to the invention.

The pump has an impeller 90, which is rotatably arranged in the first part 10 and is attached for this purpose to a shaft 601 of the rotor 60, which shaft projects into the first part 10.

On a side facing away from the second part 20, the impeller 90 has a collar 903. The collar 903 engages in an annular groove 106 in the first part 10. (The collar and the annular groove are only provided in the case of the known pump according to FIGS. 1 and 2, but not in the case of the pump from FIG. 3.) The annular groove 106 and the collar 903 have a larger diameter than the clear cross section of the inlet fitting 103. The collar 903 therefore does not impede a liquid flow from the inlet fitting 103 into the pump chamber P. Nor does the collar 903 come into contact with the inflowing liquid, since the collar 903 projects into the annular groove 106. A movement of the collar 903 therefore has no effect on the inflowing liquid.

The collar 903 of the impeller 90 is guided in the annular groove 106 of the first part 10.

Present between the collar 903 and an inner wall 108 of the annular groove 104 and between the collar 903 and an outer wall 107 of the annular groove 106 is an inner or an outer annular gap, respectively. The collar 903 projecting into the annular groove 106 prevents a liquid flow past the impeller 90 from the intake fitting 103 to the outlet. At most a small leakage flow through the annular gaps is possible.

The impeller 90 has a bushing 901, preferably made of metal, with a central through hole in which the rotor shaft 601 is inserted, so that the impeller 90 with the bushing 901 sits on the rotor shaft 601 in a rotationally fixed manner, preferably in a press fit. Parallel to the central through hole of the bushing 901, the rotor has through holes 902, through which a liquid can flow from a side of the impeller 90 facing the second part 20 to a side of the impeller 90 facing the inlet.

The wall of the first part 10 delimiting the pump chamber P in the radial direction tapers to the same extent that the spiral space S of the pump chamber P extends in a spiraling manner. Recesses 105 that are open toward the second part 20 are provided in this wall. In the case of the examples shown in FIGS. 1 to 3, these recesses have approximately the shape of a right cylinder with a base that resembles the sector of an annulus. For this reason, the base of the cylinder in the examples shown is similar to a sector of an annulus, wherein the inner walls of the recesses 105 follow the spiral shape of the radial boundary of the pump chamber P or of the spiral space S of the pump chamber P. Recesses 105 that taper in the circumferential direction are produced as a result. This has the further result that the recesses 105 differ from one another.

Figure 2:
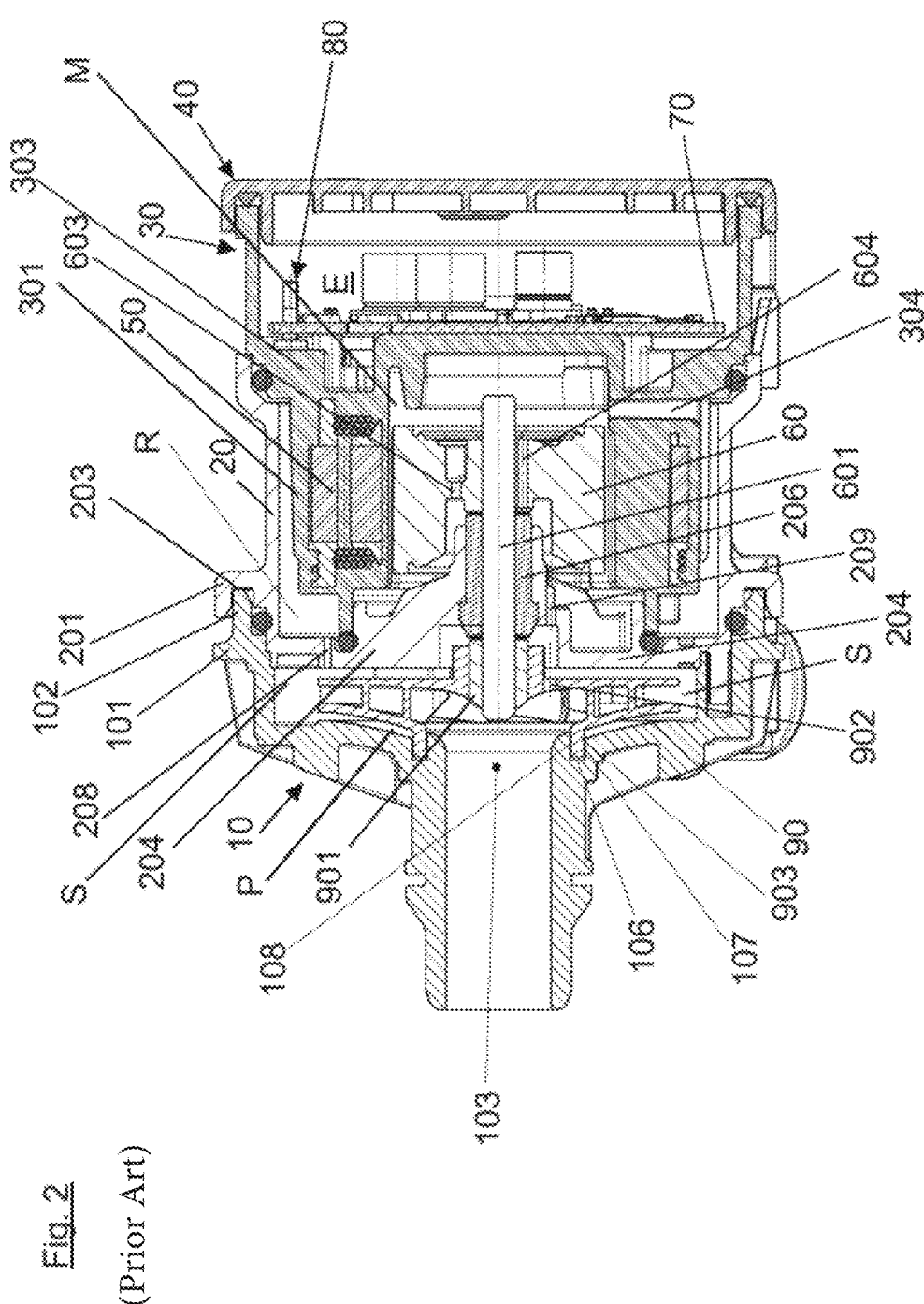
FIG. 2 shows a longitudinal section through the known pump (FIG. 2 from DE 10 2019 115 774 A1)
Figure 3:
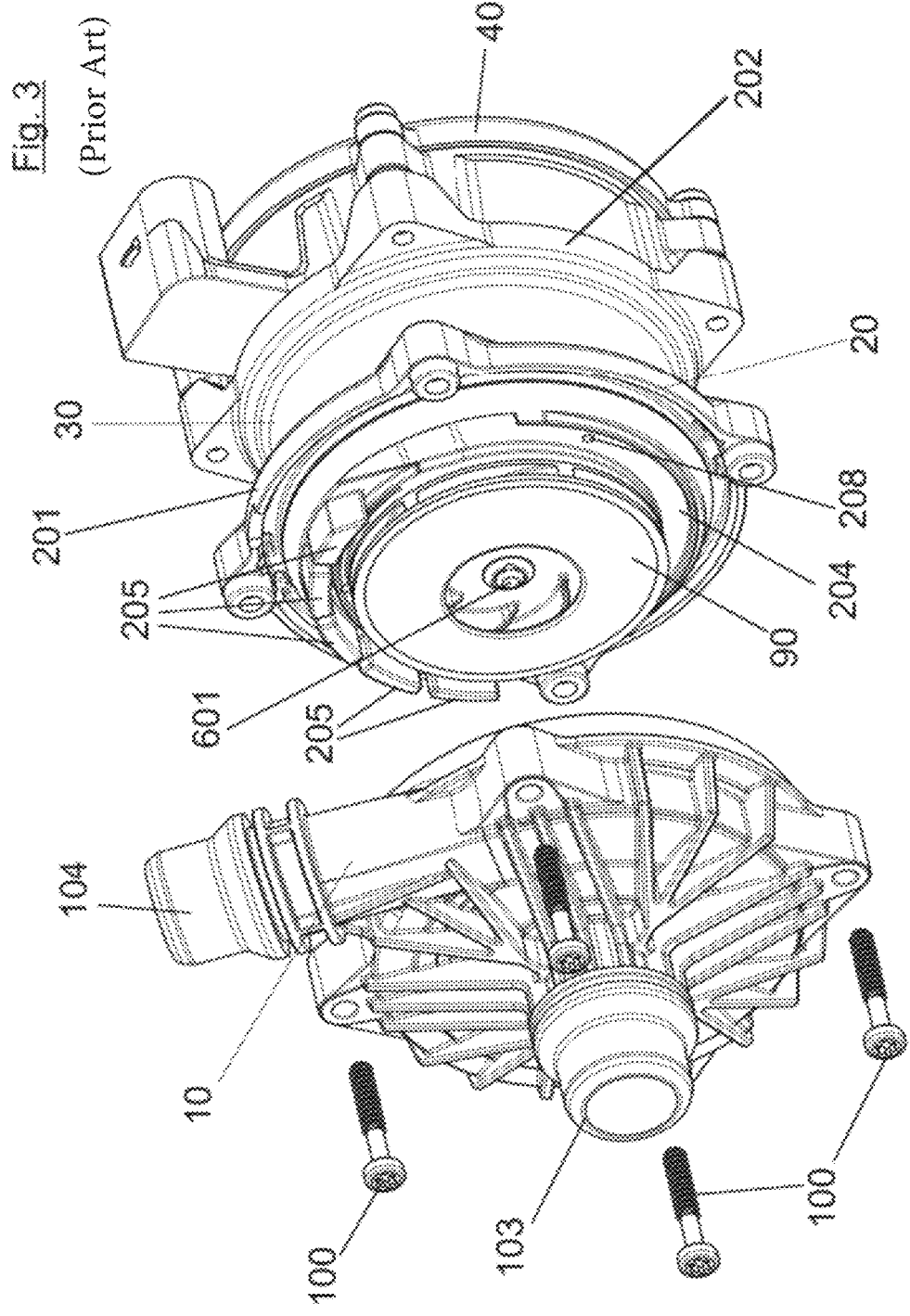
FIG. 3 shows a perspective exploded view of another known pump without the first part of a housing (FIG. 2 from DE 10 2018 125 037 A1)

In the pumps according to FIGS. 1 to 3, projections 205 that are complementary to the recesses 105 are provided on the wall 204 which faces the second part 20 and through which the rotor shaft 601 passes; in the assembled state of the pump, said projections project into the recesses 105.

Owing to the recesses 105 and the complementary projections 205, the first part 10 and the second part 20 can only be put together in one unique position during assembly of the pumps.

A unique position of the first part 10 and of the second part 20 could also be achieved in other ways.

The recesses 105 and projections 205 also have another effect. The region of the first part 10 and of the second part 20, in which the recesses 105 or the projections 205 are provided, separates the high-pressure region and the low-pressure region of the pump chamber P or of the spiral space S. These areas must be sealed from one another as well as possible so that a flow of liquid in the liquid circuit bypassing the lines connected to the pump is prevented as much as possible, and the pump can operate as effectively as possible. If the projections 205 and the recesses 105 were not provided, flat surfaces of the first part 10 and of the second part 20 would abut one another instead thereof. In contrast, a type of labyrinth seal is produced by the projections 205 and recesses 105, providing improved sealing between the high-pressure region and the low-pressure region even without an additional seal.

Provided in the aforementioned wall 204 through which the rotor shaft 601 passes is a bushing 206, which serves as a bearing for the rotor shaft 601. The bushing 206 for supporting the rotor shaft is inserted in the aforementioned wall 204 and firmly connected to the other second part 20. The bushing 206 has a through hole whose cross section is matched to the rotor shaft 601. One or more grooves can be provided axially in the wall of the through hole, through which a liquid can flow between the pump chamber P and a motor chamber M delimited by the second part 20 and the skirt 301, and vice versa, when the rotor shaft 601 is inserted. Small quantities of the liquid carried by the grooves 207 are entrained by the shaft 601 during rotation of the rotor and provide for lubrication between the rotor shaft 601 and the bushing 206.

Provided in the wall 204 through which the rotor shaft 601 passes, in the region of the spiral space S, are one or more through holes 208, which creates or create a connection between the spiral space S and an annular chamber R delimited by the motor housing 20, the skirt 301, and an end wall 303 of the electronics housing 30. A liquid can be conveyed through the through holes 208 from the spiral space, which is located on the high-pressure side of the impeller 90, into the annular chamber R.

The annular chamber R is connected to the motor chamber M by one or more radial through holes 304 in the skirt 301. The through holes 304 are provided in the vicinity of the end wall 303. A liquid that crosses from the annular chamber R into the motor chamber M can be conveyed through the motor chamber M, for example through a gap between the rotor 60 and the skirt 301, to the side of the motor chamber M facing the pump chamber P with respect to the rotor 60.

In the case of the pump, first through holes 603 and second through holes 604 are provided in a region of the rotor 60 between the shaft and the permanent magnet. The first through holes 603 extend parallel to the shaft 601 in a region directly adjacent to the shaft 601. The second through holes 603 are radially further distant from the rotor shaft 601, and thus closer to a permanent magnet that is embedded in the rotor. Both through holes connect a space of the motor chamber on a first side of the rotor and a space of the motor chamber on a second side of the rotor.

The liquid can be conveyed to the inlet side of the impeller 90, which is to say to the low-pressure side of the impeller 90, through the through holes 603, 604 in the rotor 60, the aforementioned and optionally provided grooves in the bearing bushing 206 of the rotor shaft 601, the through holes 209 in the wall 204, and the through holes 902 in the impeller 90. A continuous connection thus exists from the spiral space S, which is to say the high-pressure side of the pump chamber P, through the through holes 208 between the spiral space S and the annular chamber R into the annular chamber R, from there through the through holes 304 between the annular chamber R and the motor chamber M into the motor chamber M, and from the motor chamber M through the through holes 603, 604, and through the grooves 207 in the bearing bushing 206 if applicable, the through holes 209, and the through holes 902 in the bushing 901 of the impeller 90 to the inlet side of the impeller 90, the low-pressure side of pump chamber P. A liquid flow is established along this path during operation of the pump that, despite being significantly smaller than the flow conveyed by the pump to the outlet, is nevertheless large enough to achieve adequate cooling of the pump at rated operation.

Figure 4:
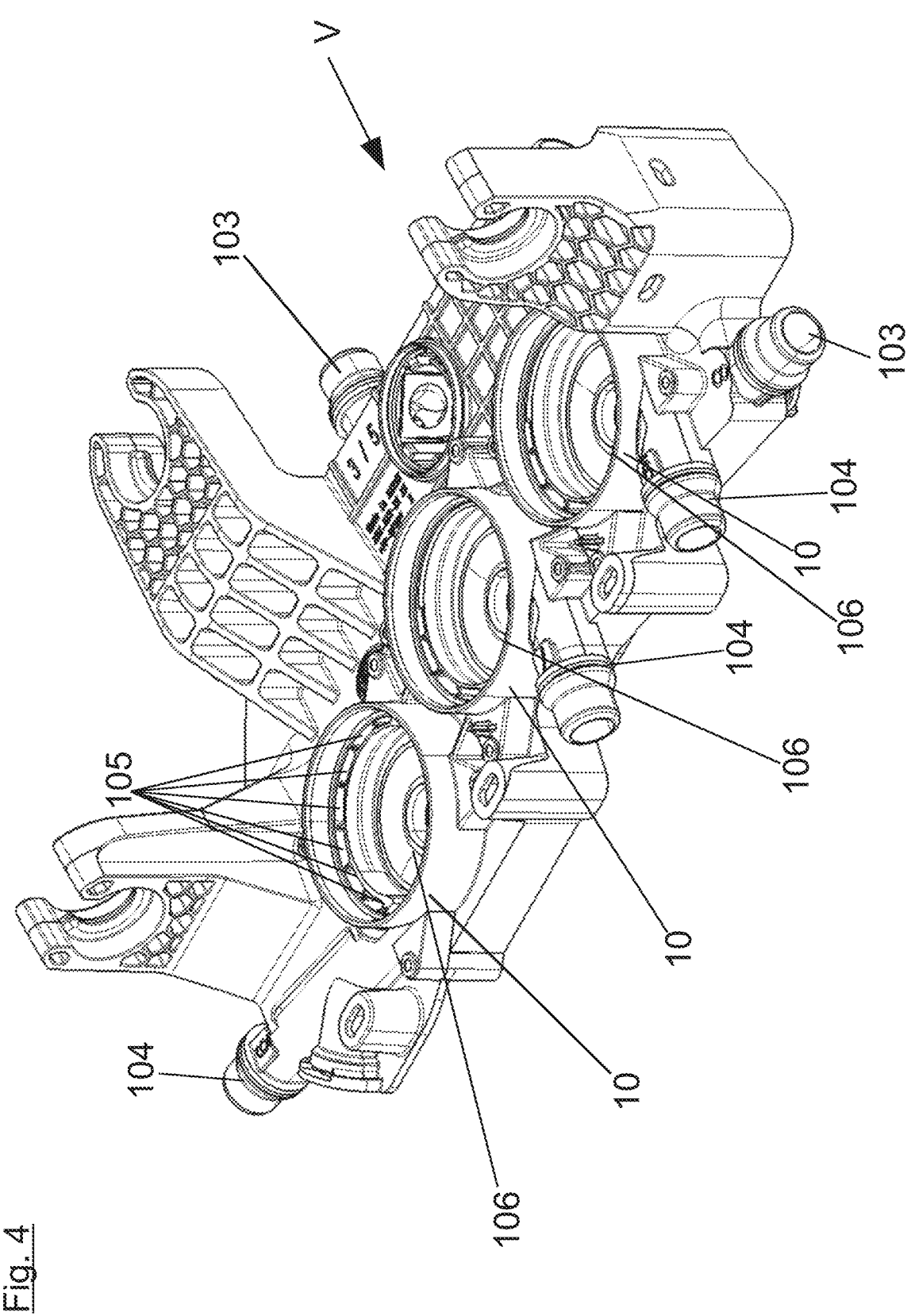
FIG. 4 shows a perspective view of a distributor device of an arrangement according to the invention.
Figure 6:
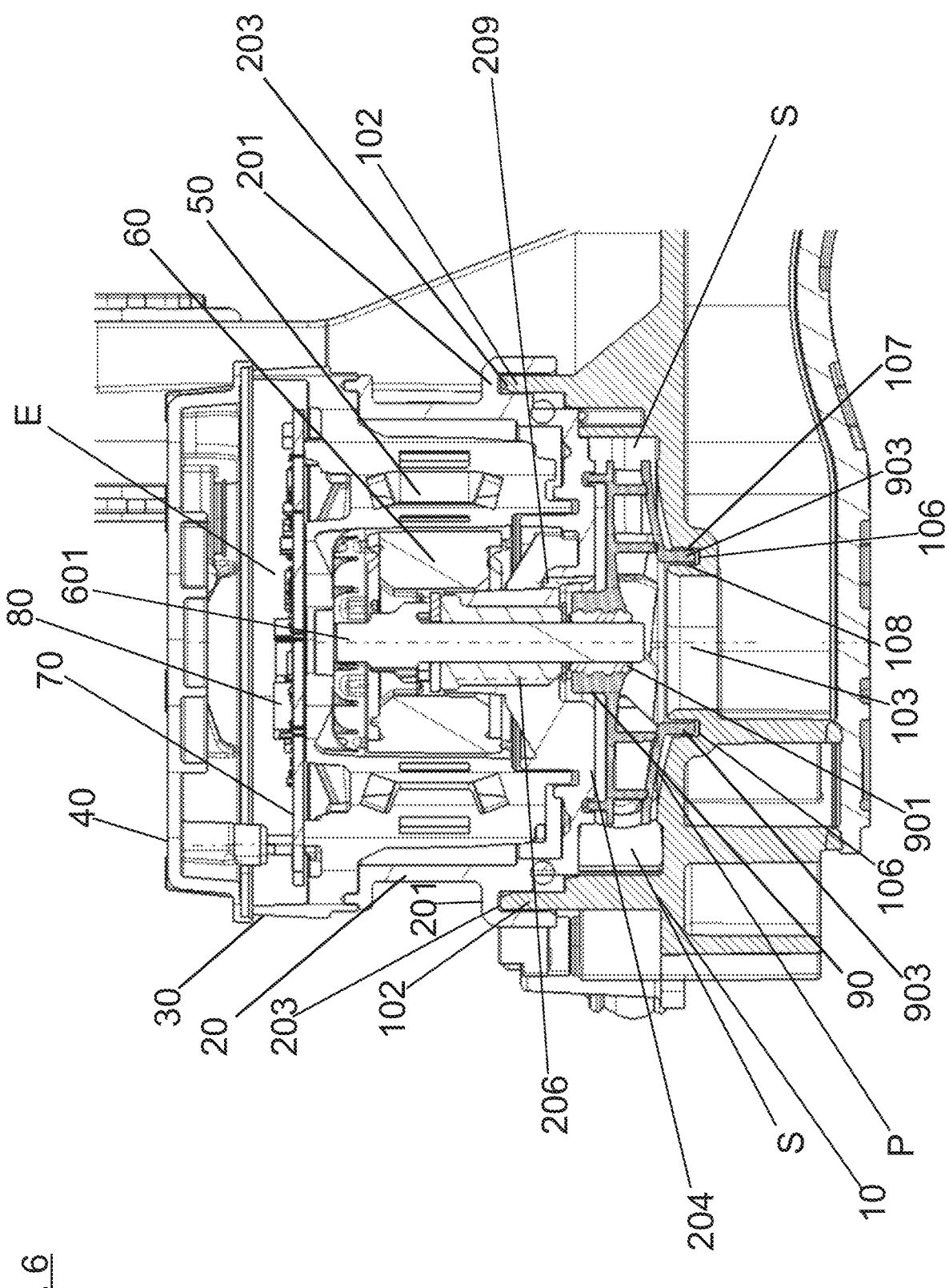
FIG. 6 shows a view of a part of a longitudinal section through a pump of an arrangement according to the invention.

The distributor device V of an arrangement according to the invention shown in FIG. 4 ff. forms three first parts of a housing of a pump, as are known from the pump in FIGS. 1 and 2. These first parts formed in the distributor device have all the features described above of the first part of the pump according to FIGS. 1 and 2. Thus, the recesses 105 and the annular groove 106 that interact with the projections 205 of the second part 20 of the housing or with the collar 903 of the impeller 90 are, in particular, formed in these first parts. In addition, a continuous web 102, an intake fitting 103, an outlet fitting 104, and an outer wall 107 are provided in the regions of the distributor device V forming the first parts 10. These elements are designed in the same way as in the first part of the pump from FIGS. 1 and 2, at least in the case of the part interacting with the impeller 90 and the second part 20 of the housing. As a result, it is possible to fasten three pumps according to FIGS. 1 and 2 without the first part 10 of the housing, or pumps in which the second part 20 and the impeller 90 are designed as in the pump from FIGS. 1 and 2, to the distributor device V in order to thus form complete pumps. A pump of this nature is shown in FIG. 6.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement for at least one cooling circuit of a motor vehicle, the arrangement comprising: a housing having a first part and at least one second part; a tank and/or a distributor device; and a pump, the pump comprising: the at least one second part of the housing; a motor with a stator and a rotor, which are arranged in the housing of the pump; and a pump chamber that is provided in the housing and in which an impeller of the pump is arranged such that the impeller rotates and is driven by the motor, the impeller conveying a medium to be conveyed by the pump, wherein the first part of the housing is formed by a part of the tank or a part of the distributor device of the arrangement, such that a fully assembled state of the housing and pump is formed when the at least one second part of the housing of the pump is attached to the first part of the housing of the tank or the distributor device, wherein the first part of the housing is integral with the tank or the distributor device, such that the first part of the housing and the tank or the distributor device are monolithic, wherein an annular groove, in which a collar of the impeller of the pump engages, is provided in the first part of the housing, via which the impeller is supported in the housing, wherein recesses that are open toward the at least one second part of the housing are provided in the first part of the housing, and wherein projections that engage in the recesses are provided on the at least one second part of the housing.

2. The arrangement according to claim 1, wherein the first part of the housing forms a part of a boundary of the pump chamber.

3. The arrangement according to claim 1, wherein the first part of the housing forms a wall that delimits the pump chamber in a radial direction.

4. The arrangement according to claim 1, wherein an intake fitting and/or an outlet fitting is provided in the first part of the housing.

5. The arrangement according to claim 1, further comprising a plurality of the pump, wherein the tank and/or the distributor device includes a plurality of the first part of the housing, such that each respective pump is attachable to each respective first part of the housing of the tank and/or the distributor device.

6. The arrangement according to claim 1, further comprising an annular groove provided in the first part of the housing, wherein a collar of the impeller of the pump engages in the annular groove via which the impeller is supported in the housing, and wherein the recesses of the first part of the housing circumferentially surround the annular groove.

\*   \*   \*   \*   \*